(12) United States Patent
Dhir et al.

(10) Patent No.: US 11,790,049 B1
(45) Date of Patent: Oct. 17, 2023

(54) TECHNIQUES FOR IMPROVING MACHINE-LEARNING ACCURACY AND CONVERGENCE

(71) Applicant: Amazon Technologies, Inc., Seattle, WA (US)

(72) Inventors: Gaurav Dhir, Bothell, WA (US); Ankit Sirmorya, Bothell, WA (US); Ying Li, Falls Church, VA (US)

(73) Assignee: Amazon Technologies, Inc., Seattle, WA (US)

( * ) Notice: Subject to any disclaimer, the term of this patent is extended or adjusted under 35 U.S.C. 154(b) by 366 days.

(21) Appl. No.: 17/218,759

(22) Filed: Mar. 31, 2021

(51) Int. Cl.
| | |
|---|---|
| *G06F 18/40* | (2023.01) |
| *G06F 3/0481* | (2022.01) |
| *G06N 20/00* | (2019.01) |
| *G06N 5/04* | (2023.01) |
| *G06F 3/04842* | (2022.01) |
| *G06V 10/40* | (2022.01) |
| *G06F 18/22* | (2023.01) |
| *G06V 30/14* | (2022.01) |

(52) U.S. Cl.
CPC ............ *G06F 18/40* (2023.01); *G06F 3/0481* (2013.01); *G06F 3/04842* (2013.01); *G06F 18/22* (2023.01); *G06N 5/04* (2013.01); *G06N 20/00* (2019.01); *G06V 10/40* (2022.01); *G06V 30/14* (2022.01)

(58) Field of Classification Search
CPC .... G06F 18/40; G06F 3/0481; G06F 3/04842; G06F 18/22; G06N 5/04; G06N 20/00; G06V 10/40; G06V 30/14
See application file for complete search history.

(56) References Cited

U.S. PATENT DOCUMENTS

| | | | |
|---|---|---|---|
| 10,185,893 B2 * | 1/2019 | Townsend | G06V 10/82 |
| 10,515,275 B2 * | 12/2019 | Lu | G06F 16/56 |
| 10,747,989 B2 * | 8/2020 | Zou | G06V 10/82 |
| 11,017,203 B1 * | 5/2021 | Aggarwal | G06V 40/1365 |
| 11,080,918 B2 * | 8/2021 | Chen | G06N 3/08 |
| 11,087,187 B2 * | 8/2021 | Meena | G06V 30/127 |
| 11,328,513 B1 * | 5/2022 | Osherovich | G06V 10/751 |
| 11,386,306 B1 * | 7/2022 | Siddiquie | G06V 10/774 |

* cited by examiner

*Primary Examiner* — Helen Zong
(74) *Attorney, Agent, or Firm* — Kilpatrick Townsend & Stockton LLP

(57) ABSTRACT

Systems and methods are described herein for reducing the computational burden related to performing one or more experiments. The set of item assets (e.g., images, text, features, descriptions, etc.) may be reduced in an intelligent manner to enable the set to include more disparate assets. The system may obtain vectors that describe each asset. A similarity score (or other indication/representation of similarity) may be presented for each pair of assets and displayed at a user interface. Using the similarity scores (or similarity representations) as a guide, the user may reduce the set of assets. The reduced set of assets may then be utilized to perform one or more experiments in order to identify an optimal selections from the assets. In some embodiments, the one or more experiments may utilize an explore/exploit algorithm (e.g., a multi-armed bandit algorithm) to identify an optimal selection of item assets.

20 Claims, 11 Drawing Sheets

| Images | | Image 1 | Image 2 | Image 3 |
|---|---|---|---|---|
| | | | | |
| | Image 1 | 1 | 0.29678 | 0.2738 |
| | Image 2 | 0.29678 | 1 | 0.26346 |
| | Image 3 | 0.2738 | 0.26346 | 1 |

TECHNIQUES FOR IMPROVING MACHINE-LEARNING ACCURACY AND CONVERGENCE

BACKGROUND

Online retail websites present item information in a variety of forms. Often, one or more images of the item is displayed as well as textual data such as a title, a set of features, a product description and the like. It can be difficult to determine what information may be best suited to provide the information a user requires to evaluate the item. Experiments may be performed which present various combinations to users over time in an attempt to identify optimal content and display format. However, these experiments are computationally expensive and may take weeks to identify an optimal combination. In the meantime, users of the website are left with a sub-optimal experience. Embodiments of the invention discussed herein address these and other problems, individually and collectively.

BRIEF DESCRIPTION OF THE DRAWINGS

Various embodiments in accordance with the present disclosure will be described with reference to the drawings, in which:

FIGS. 3-7 illustrates a variety of exemplary user interfaces with which the computational burden of the system may be reduced, in accordance with at least one embodiment;

DETAILED DESCRIPTION

Figure 1:
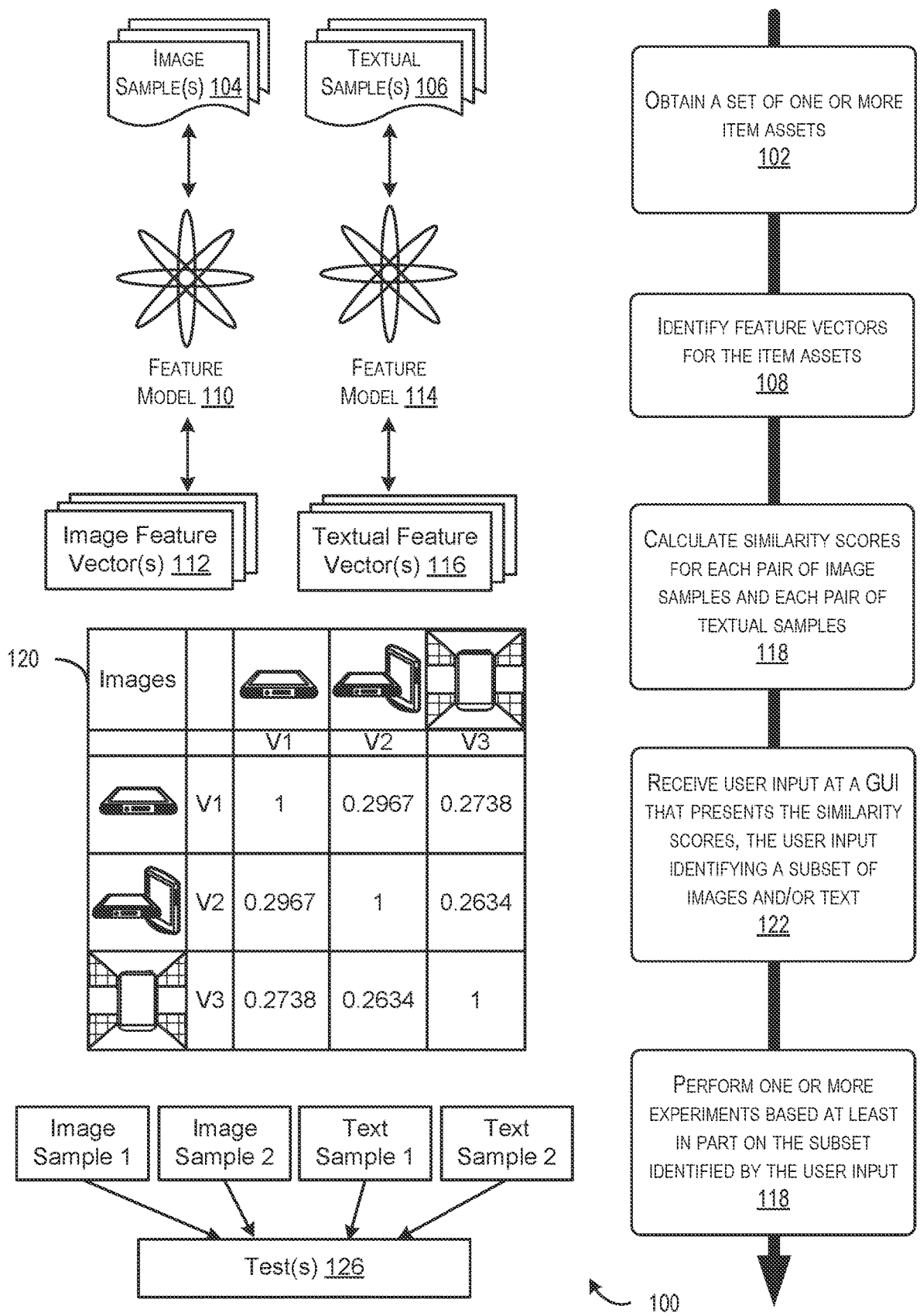
FIG. 1 illustrates a flow for reducing a computational burden related to performing one or more experiments, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to reducing a computational burden of performing one or more network-based experiments. In at least one example, a network-based experiment is conducted on network pages provided by or associated with an online retailer. A network-based experiment may include any suitable experiment performed on any type, number, or portion of a network page (e.g., a web page that may be provided to one or more computing devices).

For example, a network-based experiment may include determining a particular combination of item assets (e.g., images and/or textual examples such as titles, descriptions, bulleted item features/attributes, and the like) to be provided on an item detail page utilizing a multi-armed bandit algorithm. An "item" is intended to refer to a product, a service, a sellable unit, or anything else that may be managed or otherwise physically or electronically stored as inventory. An item's detail page may correspond to a network page that is specific/dedicated to the item. A multi-armed bandit problem is a problem in which a fixed limited set of resources (e.g., network traffic) is allocated between competing/alternative choices (e.g., different combinations of the item assets as depicted on a corresponding network page), when each choice's properties are only partially known at the time of allocation, and may become better understood as time passes or by allocating resources to the choice. By way of example, a first network page may include one combination of item assets (e.g., one or more images of the item, one or more features of the item, a title, an item description, etc.) and a second network page may include a different combination of item assets (e.g., at least one of: a different image, title, description, or feature set, etc.). As part of the multi-armed bandit problem, the first and second network pages (or any suitable number of network pages featuring different item asset combinations) may be served to users of an online retail website in order to measure respective user interactions with respect to each network page. Each network page may differ from other network pages in at least one aspect. As time goes on, network pages that appear to be more successful (e.g., illicit more traffic, more user interactions, etc.) may be allocated a larger portion of network traffic. This process may continue until one network page featuring a particular combination of item assets is allocated all of the network traffic. This particular combination is referred to herein as the "winning combination" and/or "most-optimal combination." It can be a lengthy process for the multi-armed bandit model (e.g., or any suitable model trained utilizing reinforced learning techniques) to converge on an answer (e.g., a selection of the winning combination). Each potential item asset to be considered can add a considerate amount of time to the process for identifying the winning combination/most-optimal combination. Thus, the techniques disclosed herein may improve the execution of a multi-armed bandit algorithm (or other suitable reinforced learning and/or explore/exploit algorithm) by enabling the set of item assets to be intelligently reduced prior to executing the one or more experiments. By reducing the number of item assets to be utilized, the overall number of combinations is reduced, which in turn enables the winning combination to be determined more quickly.

Performing the types of experiments described above is computationally burdensome. It can take weeks for the process to converge (e.g., for a winning combination to be identified). It may be the case that at least some of the available item assets (e.g., images, titles, item descriptions, item feature sets, etc.) are similar to one another (e.g., exceed a similarity threshold when compared). Due to this similarity, it may be unlikely that presenting both item assets in an experiment would produce a statistically significant result. Said another way, due to the assets' similarity, it is unlikely that significantly different results would be realized between presenting one asset versus the other. Thus, presenting both assets during the experiments can waste computational resources without providing much, if any, helpful information with which an optimal combination of assets can be identified.

Accordingly, needless processing waste can be eliminated by identifying when item assets are too similar. A machine-learning model (e.g., a neural network, a classification model) can be previously trained to identify a feature vector for an item asset (e.g., an image, a textual example such as an item title, an item description, a set of items features (text describing one or more attributes of the item)). A machine-learning model (or a "model", for brevity) refers to a function that is fit to map inputs to outputs based on training data. A feature vector is an n-dimensional vector of numerical features that describes individual measurable properties or characteristics of the input being observed. A feature vector for an image may be referred to herein as an "image feature vector," and may describe the properties and/or characteristics of the image, while a feature vector for a textual example may be referred to as a "textual feature vector," and may describe the properties and/or characteristics of the text example. To identify a similarity between two item assets (e.g., two images, two textual examples, etc.), a distance may be calculated to quantify the distance between the two vectors. By way of example, a Euclidean distance (e.g., the square root of the sum of squared differences between corresponding elements of two vectors) may be calculated to quantify the similarity/dissimilarity between the two vectors, referred to as a "similarity score." The similarity score may be a numeric value (e.g., a percentage, a value between 0 and 1, etc.).

In some embodiments, the similarity scores of various pairs of item assets may be provided via a user interface (e.g., a grid, a list, etc.). A predefined similarity threshold (e.g., a similarity threshold value) may be utilized to identify pairs that are too similar (e.g., pairs for which the similarity score exceeds the similarity threshold value). In some embodiments, the pairs identified as being two similar may be visually indicated to the user (e.g., using indicators for highlighting the score such as using color, bolding, font, animation, or the like). Using the indicators as a guide, the user may select any suitable item for removal from the set. Upon removing an item from the set, the user interface may be updated to include only the remaining item assets. Once the user has completed their removal selections, one or more experiments (e.g., one or more experiments for identifying an optimal combination of one or more item assets) may be performed. It should be appreciated that a similar process as described above may be performed any suitable number of times depending on the dimensionality of the item assets (e.g., how many different types of item assets are available). For example, the process may be performed once for images, once for textual samples such as item titles, and again for textual examples such as an item feature set. A similar user interface may be provided for each item asset type (e.g., images, textual titles, textual item features, textual item descriptions, and the like) such that the user can filter item assets that are too similar to other item assets to produce a statistically significant difference. Having multiple similar images can not only lead to multiple winners (e.g., inaccurate outcomes) and can cause the process to take more time to converge (e.g., to identify an optimal combination/winner). By enabling the user to intelligently remove significantly similar assets, the number of item assets to be utilized for the experiments is reduced, enabling the process for identifying an optimal combination to be performed more quickly as well as more accurately as substantially duplicative data will have been removed from the set in advance of the experiments. This can be beneficial in context in which a reinforced learning algorithm is being utilized for the experiments. "Reinforced learning" refers to an area of machine learning in which intelligent agents are configured to take action (e.g., reallocate network traffic to particular network pages featuring particular combination of network assets) based on input received over time (e.g., user interactions indicating viewing of the item featured by a given network page, adding the item to a shopping cart, purchasing the item, and the like) in order to maximize the notion of cumulative reward. The purpose of reinforcement learning is for the agent to learn an optimal, or nearly-optimal, policy that maximizes the "reward function" or other user-provided reinforcement signal that accumulates from the immediate rewards. By way of example, if a network page elicits more user interactions, it can be rewarded with more network traffic until, eventually, a single network page (corresponding to a particular combination of item assets) of the experiment can be allocated all of the network traffic (indicating that particular combination of item assets are the best combination of any of the various item asset combinations utilized in the network pages of the experiment(s)).

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates a flow 100 for generating a reduced set of item assets for one or more subsequent experiments, in accordance with at least one embodiment.

The flow 100 may begin at 102, where a set of one or more item assets may be obtained. Item assets may include any suitable combination of one or more images of an item and/or one or more instances of text related to the item (e.g., item titles, item descriptions, a set of item features, etc.). In some embodiments, these item assets may be predefined and stored at one or more storage locations. Image sample(s) 104 may include any suitable number of images of an item. By way of example, image sample(s) 104 may include two or more images of an item provided by an electronic catalog (e.g., a catalog of items offered for consumption by an online retail website). For purposes of illustration, textual sample(s) 106 may include any suitable number of textual titles for the item. It should be appreciated that in some embodiments, textual sample(s) 106 may include any suitable number of textual types. For example, textual sample(s) 106 may include various titles for the item, descriptions for the item (e.g., a paragraph describing the item), a set of features (e.g., features to be provided as bullet points on a detail webpage dedicated to the item), and the like. The process performed with textual sample(s) 106 may be performed any suitable number of time depending on the number of textual types utilized. By way of example, the process described with respect to the textual sample(s) 106 may be repeated for item titles, again for item description, and again for item feature sets. The image sample(s) 104 and textual sample(s) 106 may be retrieved from any suitable data store (e.g., a storage location associated with an online retail website).

At 108, a number of feature vectors may be identified for the item assets. By way of example, feature model 110 may be utilized to generate any suitable number of image feature vectors (e.g., collectively, image feature vector(s) 112). Similarly, feature model 114 may be utilized to generate any suitable number of textual feature vectors (e.g., collectively, textual feature vector(s) 116). As a non-limiting example, feature model 110 and/or feature model 114 may be an artificial neural network (also referred to as a "neural network", for brevity). The internal processing and training of feature models 110 and 114 may be described in more detail below with respect to FIG. 2. A feature vector (e.g., individual vectors of image feature vector(s) 112 and individual vectors of textual feature vector(s) 116) is an n-dimensional vector of numerical features that describes individual measurable properties or characteristics of the input being observed (e.g., an image or textual sample, respectively). Although a neural network such as feature model 114 may be utilized to calculate textual feature vector(s) 116, these vectors could also be generated through other calculations.

By way of example, textual feature vector(s) 116 can be generated using a term frequency, inverse document frequency (TD-IDF) algorithm. These vectors can be represented in the same vector space. In some examples, the dimensionality of the vectors/vector space can be equal to a predefined vocabulary size (e.g., a number of words). A count of these vocabulary words is often referred to as frequency $f_{t,d}$ of a term t in a document d. Sublinear scaling is often applied to term frequencies such that:

$$TF(t, d) = \begin{cases} 1 + \log(f_{t,d}) & \text{if } f_{t,d} > 0, \\ 0 & \text{otherwise.} \end{cases}$$

However, this does not take into account that some words are more common than others. Therefore, values in some dimensions will be much higher than in others. Thus, term frequencies are often multiplied by inverse document frequencies such that:

$$IDF(t) = \log\frac{N}{n(t)},$$

Where N is the total number of documents in a corpus (e.g., the textual sample(s) 106) and n(t) is a number of documents containing term t. IDF may be smoothed by adding 1 such that:

$$IDF_{smoothed}(t) = \log\left(1 + \frac{N}{n(t)}\right)$$

At 118, a number of similarity scores may be calculated for each pair of the image sample(s) 104 and each pair of textual sample(s) 106 (e.g., textual samples of the same type, for example, pairs of titles, pairs of descriptions, pairs of item features, and the like, depending on the types of textual samples used). The similarity scores can be generated in a variety of ways. By way of example, if vector(s) are used, a distance measurement between the pair of vectors corresponding to the pair of item assets may be calculated. By way of example, a structural similarity index (SSIM) may be utilized as a differentiation metric. A SSIM may be based on based on the idea that pixels have strong inter-dependencies especially when they are spatially close together. In some embodiments, the SSIM may be calculated using a sliding Guassian window. In some embodiments, SSIM is a perception-based decimal value between −1 and 1, where 1 is reachable only when two inputs are identical (e.g., with perfect structural similarity). SSIM may enable cross-comparisons of images, even when the images are not the same size. The SSIM may be calculated based on the following formula:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

As another example, a Euclidean distance (e.g., the square root of the sum of squared differences between corresponding elements of two vectors) may be calculated to quantify the similarity/dissimilarity between two vectors, referred to as a "similarity score." As yet another example, (potentially normalized) pixel values for each image can be represented as a corresponding vector and the pixel values/vectors may be compared to compute the distance (e.g., difference) between them. The similarity score may be a numeric value (e.g., a percentage, a value between 0 and 1, etc.). As another example, cosine similarity may be calculated to identify the similarity between vectors. For example, an inner product of two vectors a and b serves as a similarity measurement, the similarity measurement being calculated as follows:

$$\text{sim}(a, b) = a^T b = \sum_{i=1}^{M} a_i b_i$$

where M is a number of dimensions in a vector space (e.g., the number of vocabulary words used for the count described above). In some embodiments, the inner product is normalized by each vectors length to make the measure independent of them. Thus, the cosine similarity between to vectors can be expressed:

$$\text{sim}(a, b) = \cos(a, b) = \frac{a^T b}{|a||b|}$$

The various similarity scores for each type of item asset may be provided via one or more graphical user interfaces (individually, referred to as a GUI). By way of example, the similarity scores corresponding to pairs of the image feature vector(s) 112 is presented via GUI 120. In some embodiments, the similarity scores may be presented (as depicted in FIG. 1) in a grid or other format (e.g., a list). In some embodiments, the similarity scores can quantify a degree of similarity or dissimilarity between pairs of the images. In some embodiments, the images may also be presented in GUI 120.

At 122, user input may be received at GUI 120 (e.g., a GUI that presents the similarity scores between pairs of item assets). In some embodiments, the user input may identify a subset of images of the image sample(s) 104. In some embodiments, the subset of images identified by the user input may be utilized to include the selected item assets to be utilized in one or more subsequent experiments. Or the user input may be utilized to exclude the selected item assets from being utilized in one or more subsequent experiments.

At 124, one or more experiments (e.g., test(s) 126) may be performed based at least in part on the subset identified by the user at 122. For example, the selected item assets identified at 122 may be removed from the set of item assets to provide an experimental set that includes image sample 1 and image sample 2. Similarly, user input may be received at 122 indicating the that the experimental set of item assets includes text sample 1 and text sample 2. Test(s) 126 may individually include a network-based experiment may include any suitable experiment performed on any type, number, or portion of a network page (e.g., a web page that may be provided to one or more computing devices). For example, test(s) 126 may include determining an outcome from providing any suitable number of separate network pages such as an item detail page. By way of example, a separate network page may be generated for every unique combination of item assets and provided to users via a corresponding network page (e.g., a webpage such as an item detail page specific to the item). One network page for the item may include a combination of item assets (e.g., item sample 1 and text sample 1)) and another network page for the item may include a different combination of item assets (e.g., item sample 1/text sample 2, item sample 2/text sample 1, or item sample 2/text sample 2). Each network page may be served to various users of an online retail website in order to measure respective user interactions with respect to the different item assets. Each network page may differ from other network pages in at least one aspect. As time goes on, network pages that appear to be more successful (e.g., identified as generating more traffic, more user interactions, etc.) may be allocated a larger portion of subsequent network traffic. This process may continue until one network page featuring a particular combination of item assets (e.g., image sample 1 and text sample 2, an optimal combination) is allocated all of the network traffic. Because at least some of the possible images and/or text samples were removed prior to performing test(s) 126, the time for identifying the optimal combination of item assets is reduced and the accuracy of determining the optimal mix of item assets is improved.

Figure 2:
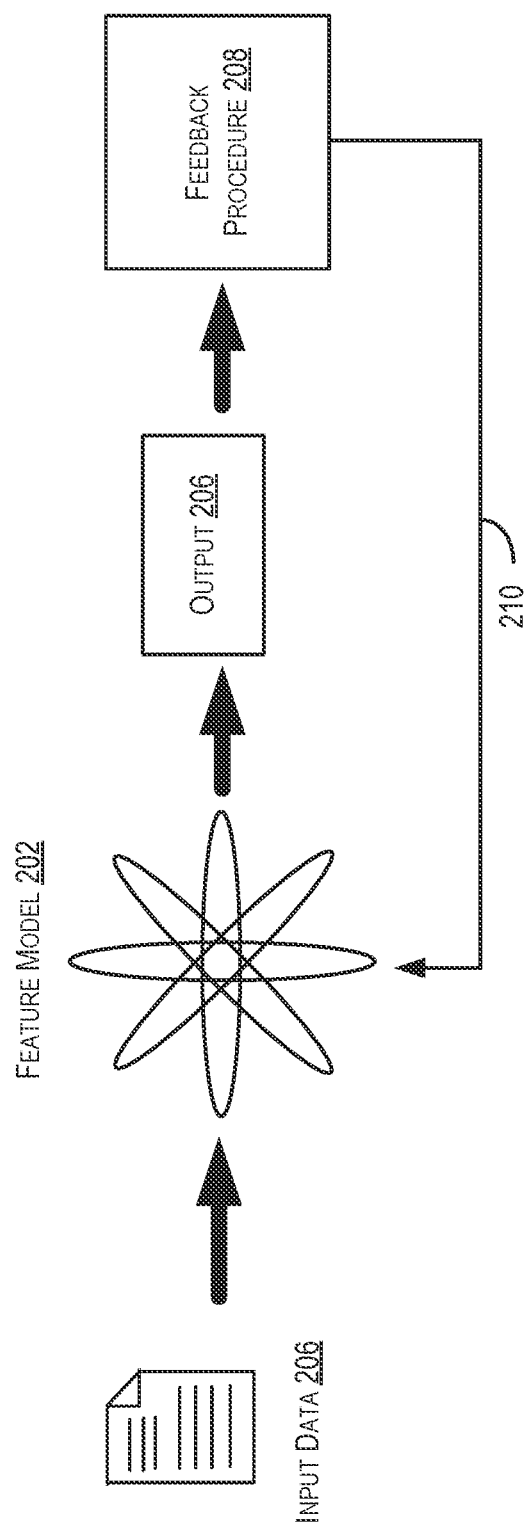
FIG. 2 illustrates a flow for an example feature vector identification process which utilizes a feature model, in accordance with at least one embodiment.

FIG. 2 illustrates a flow for an example feature vector identification process 200 which utilizes a feature model 202, in accordance with at least one embodiment. The feature model 202 may be an example of the feature model 110 or the feature model 114 of FIG. 1. In some embodiments, the feature model 202 is a neural network (e.g., a convolutional neural network having a variety of layers that communicate to each other through some calculation between them).

Neural networks are a family of learning algorithms inspired by the human brain. Neural networks include artificial neurons. Each neuron has multiple inputs and one output. Internally, a weighted sum of inputs and a bias term is calculated. The weighted sum, often called neuron pre-activation, is then passed to an activation function (the simplest form of which is a step function). When a Heaviside step function is used as an activation function of a neuron, the resultant model is called a perceptron. In some embodiments, continuous functions can be used as activators (e.g., a logistic/sigmoid function that provides output always between 0 and 1). Manual setting of neuron parameters would make wider adoption of these models infeasible. Therefore, learning neuron weights is done automatically. As in the case of other machine learning models, the weights are learned by minimizing a cost function. In the case of a neuron with a logistic activation function, the cost function L of model weights θ is:

$$L(\Theta) = -\frac{1}{N}\sum_{i=1}^{N}[y_i \log \sigma(x_i) + (1-y_i)\log(1-\sigma(x_i))]$$

Where N is the data set size (e.g., how many examples are used to train the model).

The feature model 202 may be a classifier that is trained utilizing training data (e.g., examples of images or text that have been previously labeled/classified) to classify input data (e.g., an image, a textual example, etc.). In some embodiments, the weights and biases of each node of the feature model 202 may be adjusted during training to steer the classification to the right label (e.g., the label identified in the example). A cost function may be utilized to optimize the model. The goal for training is to minimize the cost function. The output of feature model 202 (e.g., output derived from the second to last layer (e.g., the layer before classification) of the feature model 202) may be output 206. Output 206 may include a classification label and/or a feature vector that represents input data 206 as a vector.

A feedback procedure 208 may be executed utilizing the output 206. In some embodiments, at least some examples of the training data set (with known labels) may be utilized to assess the accuracy of the feature model 202. When the feature model 202 is determined to classify examples from the training data accurately over a predefined threshold (e.g., the model accurately classifies examples with the same label provided in the sample over 80% of the time, over 90% of the time, etc.), the feature model 202 can be utilized for subsequent classifications/feature vector generation. As new input data is provided to the feature model 202, feedback procedure 208 can add the input/output pairs to the training data at 210. The new training data may be utilized to incrementally update and/or retrain the feature model 202.

Figure 3:
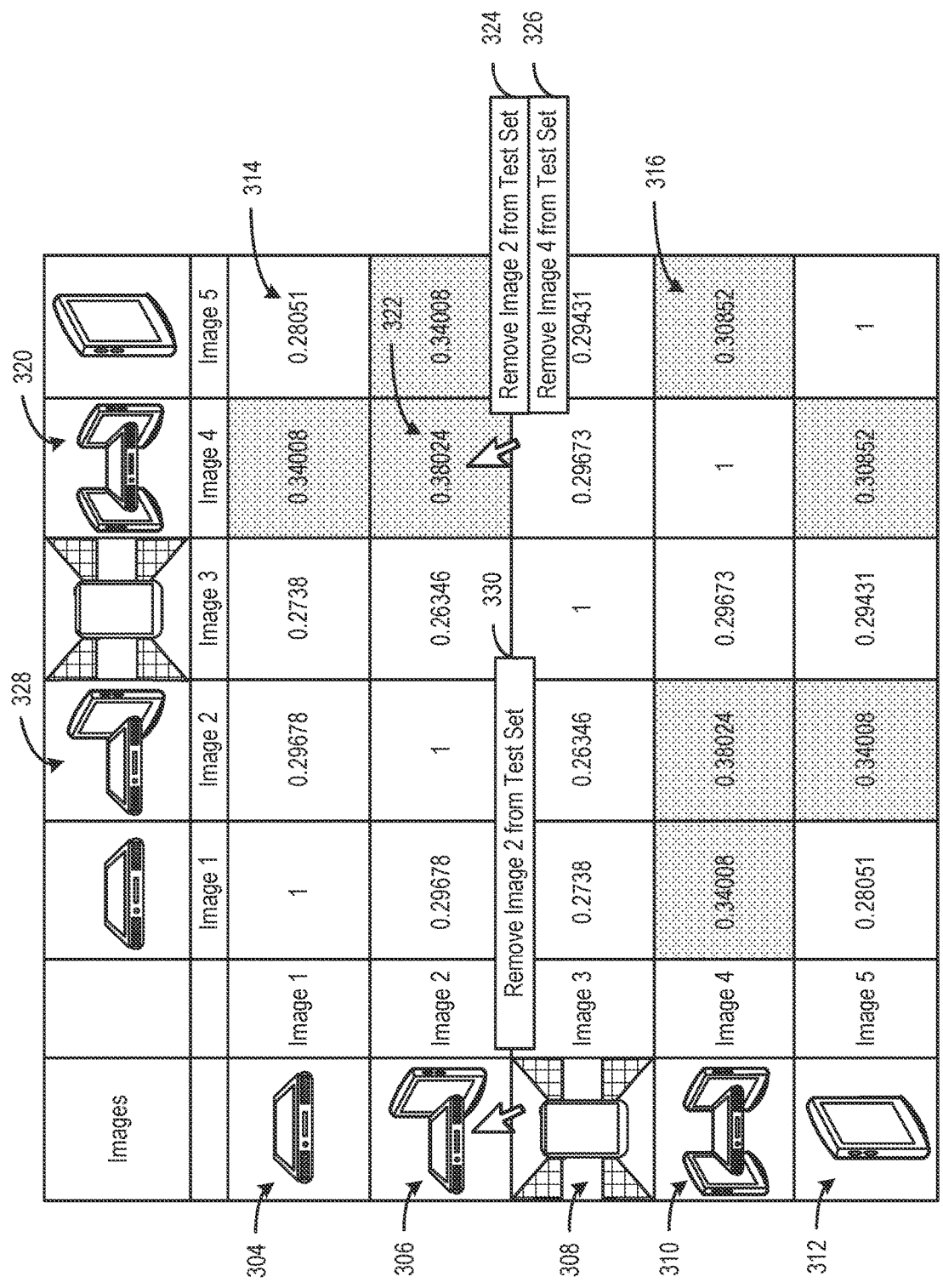

FIGS. 3-7 illustrates a variety of exemplary user interfaces with which the computational burden of the system may be reduced, in accordance with at least one embodiment;

FIG. 3 illustrates a first view of a user interface 300. In the example depicted in FIG. 3, a number of images (e.g., images 304-312 of a given item, each an example of image sample(s) 104 of FIG. 1) may be utilized. User interface 300 (an example of a graphical user interface (GUI)) may include any suitable number of similarity scores (e.g., similarity score 314) that individual quantify a degree of similarity/dissimilarity between two images. By way of example, the similarity score 314 quantifies degree of similarity. In some embodiments, the similarity score can be calculated based at least in part on a difference between the two images (e.g., a difference between two vectors of image feature vector(s) 112 of FIG. 1, a comparison between vectors including pixel values of the respective images, etc.). In some embodiments, the inverse may be calculated (e.g., 1-similarity score) to identify a similarity score that identifies a degree of dissimilarity. For example, if an output of feature model 202 indicates the image 304 and the image 312 are 0.71949 dissimilar (e.g., approximately 72% dissimilar) then the similarity score may be manipulated (e.g., similarity score=1−similarity score) to quantify an amount of similarity. For image 304 and image 312, the similarity score 314 may indicate 0.28051 similarity (e.g., 1-0.71949). The opposite may also be used. For example, if an output of feature model 302 indicates the image 304 and the image 312 are 0.28051 similar (e.g., approximately 28% similar dissimilar) then the similarity score may be manipulated (e.g., similarity score=1−similarity score) to quantify an amount of dissimilarity. For image 304 and image 312, the similarity score 314 may indicate 0.71949 dissimilarity (e.g., 1-0.28051). The feature model 202 may also output the similarity score (e.g., a similarity score that indicates a degree of similarity and/or dissimilarity).

In some embodiments, similarity scores that breach a predefined threshold (e.g., similarity scores greater than 0.30, or otherwise indicating 30% or higher similarity) may be highlighted. The predefined threshold may be user-defined and/or configurable. For example, an area (e.g., area 316) may be colored and/or shaded differently than the other areas of user interface 300. In some embodiments, the similarity scores that breach the predefined threshold (e.g., are determined to be equal to or less dissimilar than a dissimilarity threshold value, are determined to be equal to or greater than a predefined similarity threshold value, etc.) may be identifiable from other similarity scores that fail to breach the predefined threshold by at least one attribute. For example, the similarity scores can be bolded, highlighted as depicted with area 316, presented in a different color, include one or more animations, or utilizing any suitable graphical display technique. Highlighted areas may indicate a pairing of images that are identified as having a degree of similarity that may result in needless processing, multiple experiment winners, or otherwise wasteful should both be included in the set of assets to be used for subsequent experiments.

It should be appreciated that although the examples provided herein utilize a similarity score to indicate a degree of similarity between two item assets, other mechanisms for indicating the degree of similarity between two item assets may be utilized. For example, pairs of item assets that have a degree of similarity that meets a threshold condition (e.g., exceeds a similarity threshold) may be grouped or otherwise placed adjacent to one another within the user interface. In some embodiments, groups of item assets that are too similar (e.g., exceed a predefined similarity threshold) may be listed by item asset identifier and/or the item assets themselves may be displayed via the user interface. As yet another example, pairs of item assets that are too similar (e.g., exceed a predefined similarity threshold) may be indicated based on highlighting the item assets with a border indicating a common color. Thus, one pair of item assets may be bordered with a blue border to indicate that they are too similar, whereas a different pair of item assets may be bordered with a green border to indicate that they are too similar. The manner in which similarity between two items may be represented may vary.

At any suitable time, the user may select one or more items from the user interface 300. In some embodiments, the selections may relate to removing one or more items from a set of item assets to be later used for one or more experiments. The user can access a provided option to remove or add an item asset from/to the set of item assets. As a non-limiting example, the user can provide user input (e.g., a right click) within area 318, or within a threshold distance of image 306 or 320. In some embodiments, one or more options may be presented. The options may include any suitable combination of including a particular item asset or excluding (e.g., removing) a particular item asset from the set of item assets to be subsequently utilized for experimentation.

By way of example, the user may right-click within area 322. The system may identify that area 322 is related to two images (e.g., image 306 and image 310 (e.g., the same image as image 320)). As a result, the user interface may be modified to present any suitable number of options related to images 306 and 310. As a non-limiting example, option 324 and option 326 may be presented. Option 324 may be selected by the user to remove image 2 (corresponding to image 306 and 328) from the set of item assets to be utilized for experimentation. Option 326 may be selected by the user to remove image 4 (corresponding to image 310 and 320) from the set of item assets to be utilized for experimentation. As another example, if the user selects (e.g., left clicks, right clicks, taps, hovers, etc.) a location within the image 306 (or another image presented via the user interface 300), option 330 may be presented. If the user selects option 330, image 2 may be removed from the set of item assets to be utilized for experimentation. Although removal options are depicted in the example user interface of FIG. 3, other corresponding options may be utilized (e.g., options for adding a corresponding item asset to the set of item assets to be utilized for experimentation) in addition to, or in lieu of the options depicted in FIG. 3). In some embodiments, the user may be able to perform operations for selecting multiple areas and/or images before entering user input to cause one or more options to be presented. Thus, in some embodiments, the user can select an option (e.g., remove these images from the test set, the set of items to be utilized for experimentation) to perform operations with respect to each of images corresponding to the selected areas/images.

In some embodiments, the various features of user interface 300 may be presented in a grid as depicted, however, other visual containers and/or formats may be utilized. By way of example, pairs of images may be placed adjacent to one another with a similarity score indicating a degree of similarity between the two placed adjacent to the pair. A list of such information may be provided, where each entry in the list includes a pair of images and the corresponding similarity score for the pair.

Figure 4:
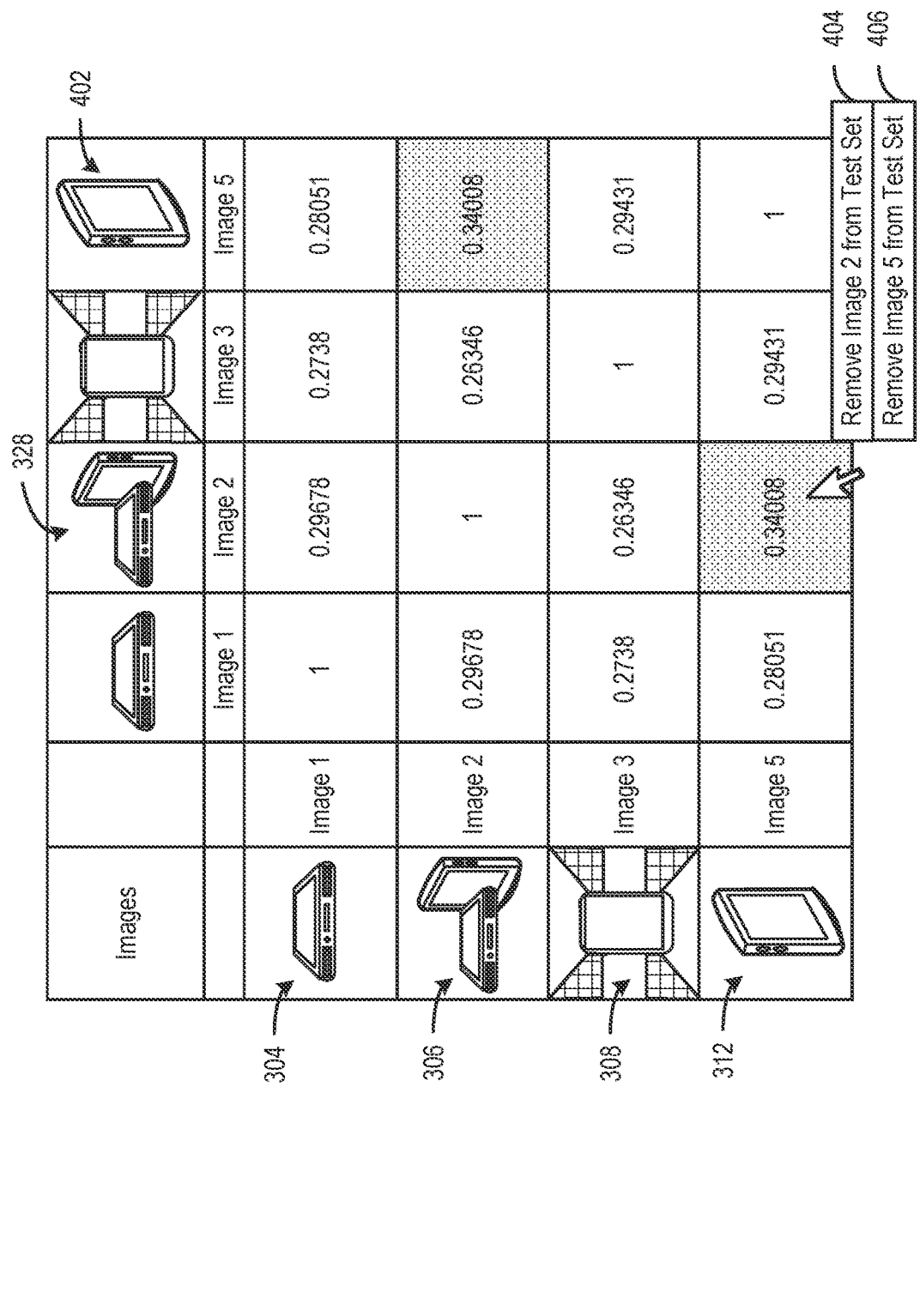

FIG. 4 illustrates a user interface 400 (e.g., a second view of a user interface 300). User interface 400 is intended to depict the user interface 300 as updated after the user selects option 326 (e.g., remove image 4 from the test set). The column and row corresponding to image 4 may be removed and the grid updated to include only the data (e.g., images, similarity scores, and/or identifiers for the images, etc.) for the images that were not removed. In some embodiments, the data removed from the grid in response to selection of option 326 may be added to another portion of the user interface (e.g., to present items removed from the test set) at another portion of the user interface (not depicted). Upon selecting (e.g., right click, left click, hovering, tapping, etc.) the image 312 (or image 402 corresponding to the image 312), options 404 and 406 may be presented.

FIG. 5 illustrates a user interface 500 (e.g., a third view of a user interface 300). User interface 500 is intended to depict the user interface 400 as updated after the user selects option 406 (e.g., remove image 5 from the test set). The column and row corresponding to image 5 may be removed and the grid updated to include only the data (e.g., images, similarity scores, and/or identifiers for the images, etc.) for the images that were not removed. In some embodiments, the data removed from the grid in response to selection of option 406 may be added to another portion of the user interface (e.g., to present items removed from the test set, such as image 4 and as provided in the ongoing example) at another portion of the user interface (e.g., a separate grid/list/container that is not depicted in FIG. 5). The user may provide any suitable user input, any suitable number of times before indicating his selections are complete (e.g., clicking an ok button or other suitable graphical user interface element, not depicted).

Figure 6:
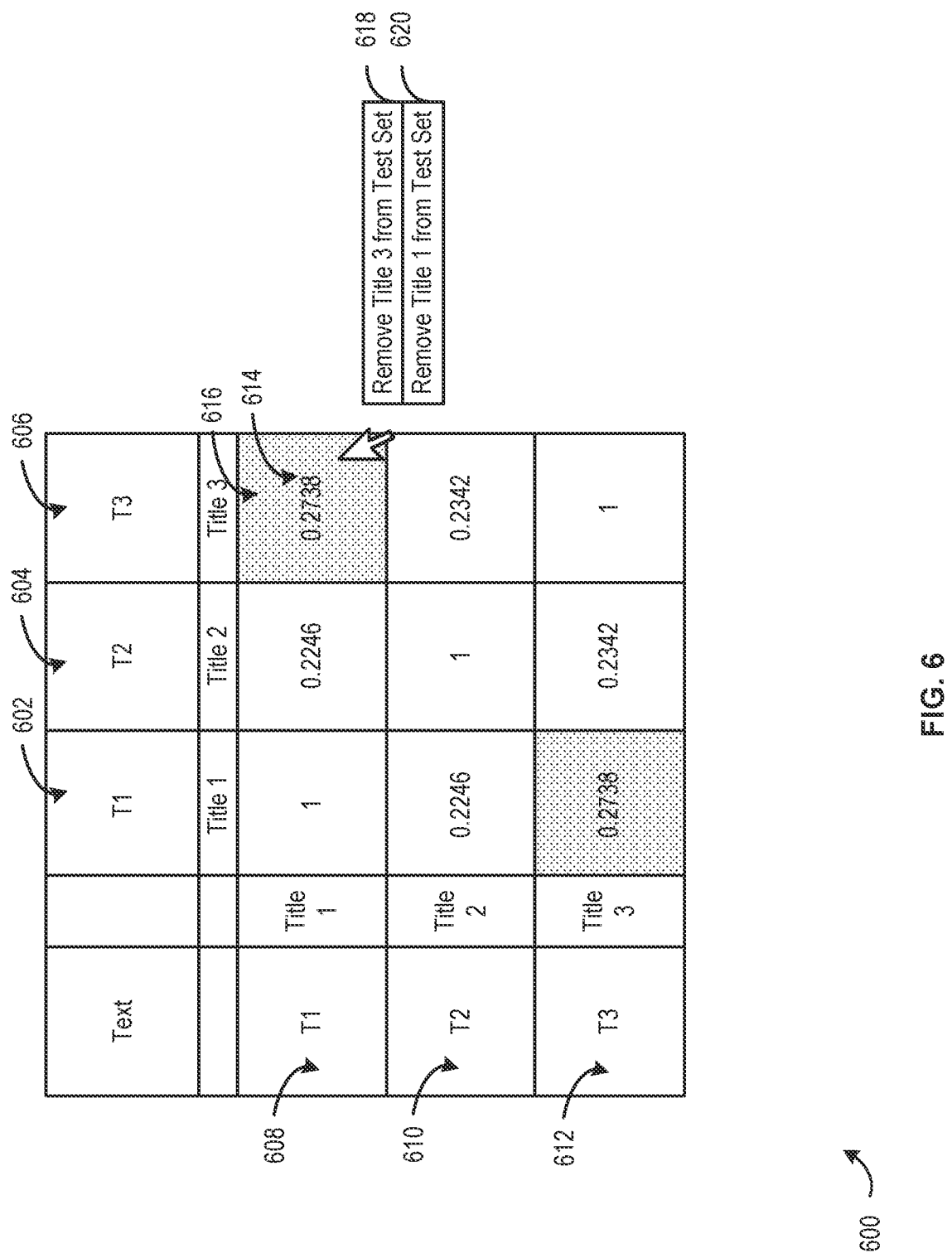

FIG. 6 illustrates a first view of a user interface 600. In the example depicted in FIG. 6, a number of textual samples (e.g., textual sample(s) 106) may be utilized. As a non-limiting example, the textual samples of FIG. 6 may be item titles (e.g., titles 1, 2, 3). The user interface 600 may be similarly utilized to present any suitable number of item descriptions, or item feature sets (e.g., respective bulleted lists of one or more item features). In some embodiments, titles 1-3 may be presented at 602, 604, and 606, respectively, and likewise at 608, 610, and 612. Areas T1, T2, and T3 may include any suitable portion of the textual example (e.g., the entire textual sample, the first 10 words, the first 2 lines, etc.).

User interface 600 (an example of a graphical user interface (GUI)) may include any suitable number of similarity scores (e.g., similarity score 614) that individual quantify a degree of similarity/dissimilarity between two textual samples. By way of example, the similarity score 614 quantifies degree of similarity. In some embodiments, the similarity score can be calculated based at least in part on a difference between the two textual samples (e.g., a cosine similarity calculated using two vectors of textual feature vector(s) 116 of FIG. 1, a comparison between vectors including TD-IDF values of the respective textual samples, etc.). In some embodiments, the inverse may be calculated (e.g., 1-similarity score) to identify a similarity score that identifies a degree of dissimilarity. For example, if an output of feature model 202 (e.g., a model trained to generate a textual feature vector from an input textual sample) indicates the textual sample 604 and the textual sample 606 are 0.70322 dissimilar (e.g., approximately 70% dissimilar) then the similarity score may be manipulated (e.g., similarity score=1−similarity score) to quantify an amount of similarity. For textual sample 606 and textual sample 608, the similarity score 614 may indicate 0.2738 similarity (e.g., 1-0.70322). The opposite may also be used. For example, if an output of feature model 202 indicates the textual samples 606 and 608 are 0.2738 similar (e.g., approximately 27% similar dissimilar) then the similarity score may be manipulated (e.g., similarity score=1−similarity score) to quantify an amount of dissimilarity. For textual samples 606 and 608, the similarity score 614 may indicate 0.70322 dissimilarity (e.g., 1-0.2738).

In some embodiments, similarity scores that breach a predefined threshold (e.g., similarity scores greater than 0.25, or otherwise indicating 25% or higher similarity, similarity scores indicating similarity of 90% or higher) may be highlighted. The predefined threshold may be user-defined and/or configurable. For example, an area (e.g., area 616) may be colored and/or shaded differently than the other areas of user interface 600. In some embodiments, the similarity scores that breach the predefined threshold (e.g., are determined to be equal to or less dissimilar than a dissimilarity threshold value, are determined to be equal to or greater than a predefined similarity threshold value, etc.) may be distinguishable from other similarity scores that fail to breach the predefined threshold by at least one attribute. For example, the similarity scores can be bolded, highlighted as depicted with area 616, presented in a different color, include one or more animations, or utilizing any suitable graphical display technique. Highlighted areas may indicate a pairing of textual samples that are identified as having a degree of similarity that may result in needless processing, multiple experiment winners, or otherwise wasteful should both be included in the set of assets to be used for subsequent experiments.

At any suitable time, the user may select one or more items from the user interface 600. In some embodiments, the selections may relate to removing one or more items from a set of item assets to be later used for one or more experiments. The user can access a provided option to remove or add an item asset from/to the set of item assets. As a non-limiting example, the user can provide user input (e.g., a right click) within area 616, or within a threshold distance of textual sample 606 or 608. In some embodiments, one or more options may be presented (e.g., options 618 and 620. The options may include any suitable combination of including a particular item asset or excluding (e.g., removing) a particular item asset from the set of item assets to be subsequently utilized for experimentation.

By way of example, the user may right-click within area 616. The system may identify that area 616 is related to two textual samples (e.g., textual samples 606 (e.g., the same textual sample as textual sample 612) and 608 (e.g., the same textual sample as textual sample 602)). As a result, the user interface may be modified to present any suitable number of options related to title 3. As a non-limiting example, option 618 and option 620 may be presented. Option 618 may be selected by the user to remove title 3 (corresponding to textual samples 606 and 612) from the set of item assets to be utilized for experimentation. Option 620 may be selected by the user to remove title 1 (corresponding to textual samples 608 and 602) from the set of item assets to be utilized for experimentation. As another example, if the user selects (e.g., left clicks, right clicks, taps, hovers, etc.) a location within a threshold distance from textual sample 608, option 620 may be presented near the location. If the user selects option 620, title 1 may be removed from the set of item assets to be utilized for experimentation. Although removal options are depicted in the example user interface of FIG. 6, other corresponding options may be utilized (e.g., options for adding a corresponding item asset to the set of item assets to be utilized for experimentation) in addition to, or in lieu of the options depicted in FIG. 6). In some embodiments, the user may be able to perform operations for selecting multiple areas and/or images before entering user input to cause one or more options to be presented. Thus, in some embodiments, the user can select an option (e.g., remove these textual samples from the test set, the set of items to be utilized for experimentation) to perform operations with respect to each of images corresponding to the selected areas/images.

In some embodiments, the various features of user interface 600 may be presented in a grid as depicted, however, other visual containers and/or formats may be utilized. By way of example, pairs of images may be placed adjacent to one another with a similarity score indicating a degree of similarity between the two placed adjacent to the pair. A list of such information may be provided, where each entry in the list includes a pair of images and the corresponding similarity score for the pair.

Figure 7:
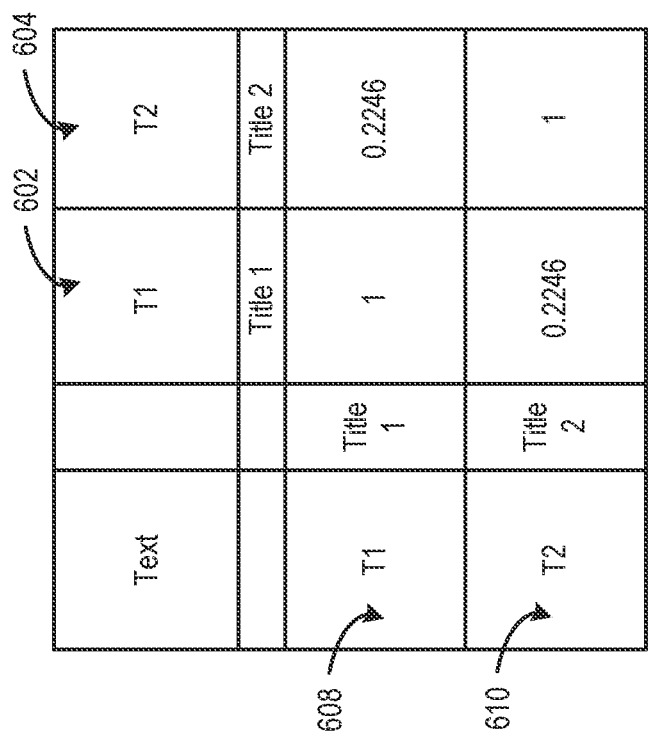

FIG. 7 illustrates a user interface 700 (e.g., a second view of a user interface 600 of FIG. 6). User interface 700 is intended to depict the user interface 600 as updated after the user selects option 618 (e.g., remove title 3 from the test set). The column and row corresponding to title 3 may be removed and the grid updated to include only the data (e.g., titles, similarity scores, and/or identifiers for the titles, etc.) for the titles that were not removed. In some embodiments, the data removed from the grid in response to selection of option 618 may be added to another portion of the user interface (e.g., to present items removed from the test set) at another portion of the user interface (not depicted).

Figure 8:
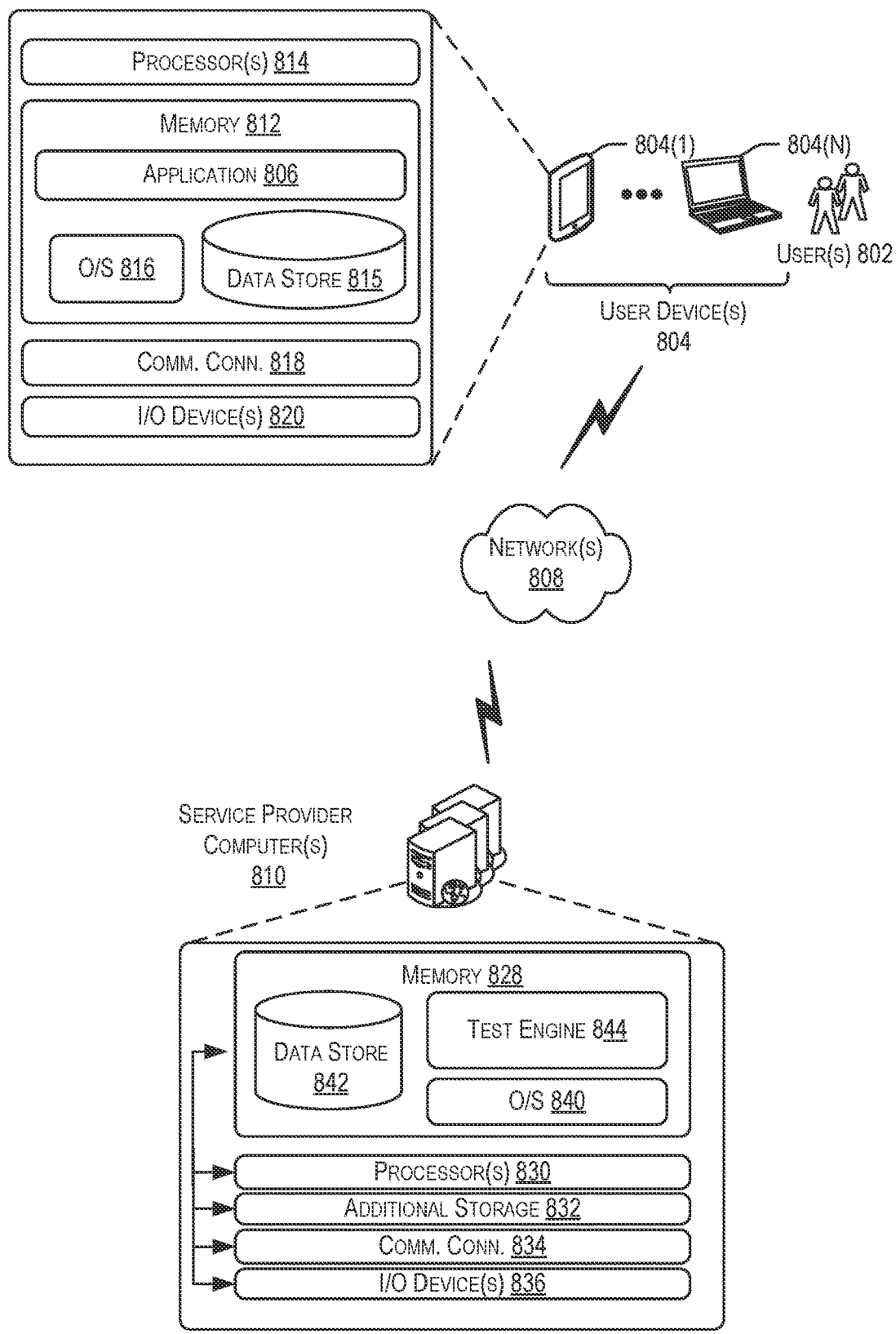
FIG. 8 illustrates components of a design system according to a particular embodiment.

FIG. 8 illustrates components of a design system 800 according to a particular embodiment. In design system 800, one or more user(s) 802 may utilize a user device (e.g., a user device of a collection of user device(s) 804 to navigate to a network page provided by the service provider computer(s) 810. For example, the user may access a user interface accessible through an application 806 running on the user device(s) 804 via one or more network(s) 808. In some aspects, the application 806 operating on the user device(s) 804 may be hosted, managed, and/or provided by a computing resources service or service provider, such as by utilizing one or more service provider computer(s) 810.

In some examples, the network(s) 808 may include any one or a combination of many different types of networks, such as cable networks, the Internet, wireless networks, cellular networks, and other private and/or public networks. While the illustrated example represents the user(s) 802 accessing application functionality over the network(s) 808, the described techniques may equally apply in instances where the user(s) 802 interact with the service provider computer(s) 810 via the one or more user device(s) 804 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the test engine 844, discussed further below in more detail, may operate in whole or in part on the user device(s) 804. Thus, in some embodiments, the user(s) 802 may access the functionality of the test engine 844 directly through the user device(s) 804 and/or the service provider computer(s) 810 via user interfaces provided by the test engine 844.

In some embodiments, the application 806 may allow the user(s) 802 to interact with the service provider computer(s) 810 so as to provide the various functionality described above with respect to the test engine 844. For example, a user may utilize the application 806 to input item details such as a category, sub-category, item description, item identifier, or any suitable information related to an item, an item category, and/or an item subcategory. In at least one example, the application 806 may provide a network page and/or user interfaces such as user interfaces 300-700 of FIGS. 3-7. The application 806 may be configured to transmit (electronically convey) the user's input(s) to the test engine 844, operating at the user device(s) 802 and/or the service provider computer(s) 810. The application 806 may further be configured to receive, process, and/or display any suitable data received from the service provider computer(s) 810 (e.g., recommended potential feature combinations).

The service provider computer(s) 810, perhaps arranged in a cluster of servers or as a server farm, may host the application 806 operating on the user device(s) 804 and/or cloud-based software services. Other server architectures may also be used to host the application 806 and/or cloud-based software services. The application 806 operating on the user device(s) 804 may be capable of handling requests from the user(s) 802 and serving, in response, various user interfaces that can be rendered at the user device(s) 804. The application 806 operating on the user device(s) 804 can present any suitable type of website that supports user interaction, including search engine sites, item detail pages, and the like. The described techniques can similarly be implemented outside of the application 806, such as with other applications running on the user device(s) 804.

The user device(s) 804 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 804 may be in communication with the service provider computer(s) 810 via the network(s) 808, or via other network connections.

In one illustrative configuration, the user device(s) 804 may include at least one memory 812 and one or more processing units (or processor(s)) 814. The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 812 may store program instructions that are loadable and executable on the processor(s) 814, as well as data generated during the execution of these programs. Depending on the configuration and type of user computing device, the memory 812 may be volatile (such as random access memory (RAM)) and/or non-volatile (such as read-only memory (ROM), flash memory, etc.). The user device(s) 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 812 may include multiple different types of memory, such as static random access memory (SRAM), dynamic random access memory (DRAM), or ROM.

Turning to the contents of the memory 812 in more detail, the memory 812 may include an operating system 816, one or more data stores 815, and one or more application programs, modules, or services for implementing the features of the test engine 844 disclosed herein, provided via the application 806 (e.g., a browser application, a shopping application, etc.). The application 806 may be configured to receive, store, and/or display a network page or other interface for interacting with the service provider computer(s) 810. Additionally, the memory 812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 804 may also contain communications connection(s) 818 that allow the user device(s) 804 to communicate with a stored database, another computing device or server (e.g., the service provider computer(s) 810), user terminals and/or other devices on the network(s) 808. The user device(s) 804 may also include I/O device(s) 820, such as a keyboard, a mouse, a pen, a voice input device, a touch input device, a display, speakers, a printer, etc.

In some aspects, the service provider computer(s) 810 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 810 are executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In some examples, the service provider computer(s) 810 may be in communication with the user device(s) 804 and/or other service providers via the network(s) 808 or via other network connections. The service provider computer(s) 810 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 810 may include at least one memory 828 and one or more processing units (or processor(s)) 830. The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computer(s) 810, the memory 828 may be volatile (such as RAM) and/or non-volatile (such as ROM, flash memory, etc.). The service provider computer(s) 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 810 may also contain communications connection(s) 834 that allow the service provider computer(s) 810 to communicate with a stored database, another computing device or server, user terminals and/or other devices on the network(s) 808. The service provider computer(s) 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, one or more data stores 842, and/or one or more application programs, modules, or services for implementing the features disclosed herein, such as the features provided by the test engine 844.

Figure 9:
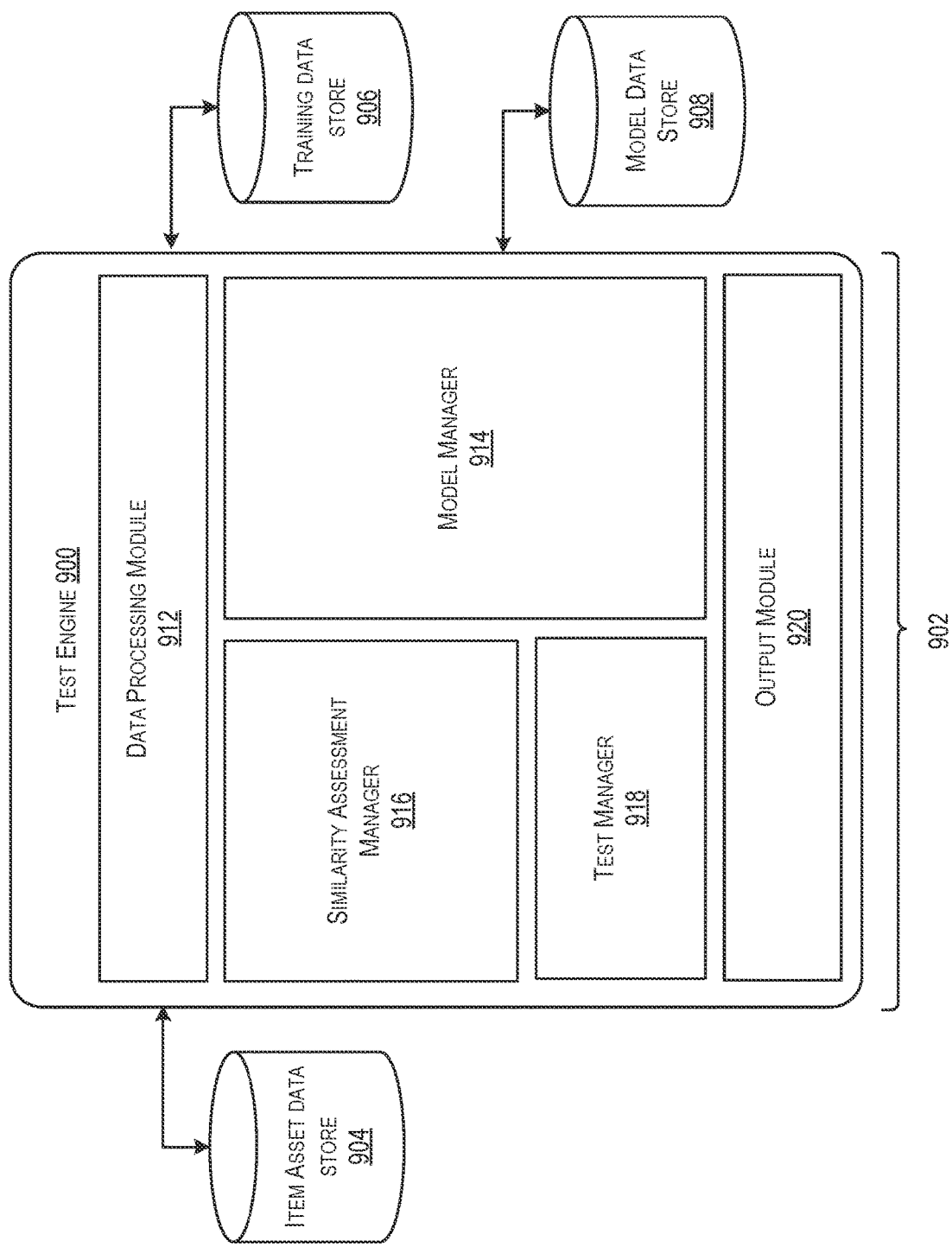
FIG. 9 is a schematic diagram of an example computer architecture for the design engine, including a plurality of modules that may perform functions in accordance with at least one embodiment.

FIG. 9 is a schematic diagram of an example computer architecture for a test engine 900 (e.g., an example of test engine 844 of FIG. 8), including a plurality of modules 902 that may perform functions in accordance with at least one embodiment. The modules 902 may be software modules, hardware modules, or a combination thereof. If the modules 902 are software modules, the modules 902 can be embodied on a computer readable medium and processed by a processor in any of the computer systems described herein. It should be noted that any module or data store described herein, may be, in some embodiments, be a service responsible for managing data of the type required to make corresponding calculations. The modules 902 may be exist as part of the test engine 900 operating on the service provider computer(s) 810 of FIG. 8, or the modules may exist as separate modules or services external to the service provider computer(s) 810 (e.g., as part of the application 806 of FIG. 8 operating on the user device(s) 804 of FIG. 8).

In the embodiment shown in the FIG. 9, item asset data store 904, training data store 906, and model data store 908 are shown, although data can be maintained, derived, or otherwise accessed from various data stores, either remote or local to the test engine 900, to achieve the functions described herein. In at least one embodiment, the data stores described herein may be physically located on the user device(s) 804 or alternatively, any suitable combination of the data stores may be operated as part of the service provider computer(s) 810, for example, as part of an test engine 900. The test engine 900, as shown in FIG. 9, includes various modules such as a data processing module 912, a sentiment processing module 514, a design management module 516, and an output module 518. Some functions of the modules 502 are described below. However, for the benefit of the reader, a brief, non-limiting description of each of the modules is provided in the following paragraphs. In accordance with at least one embodiment, a process is identifying potential feature combinations for a new item.

In at least one embodiment, the test engine 900 includes the data processing module 912. Generally, the data processing module 912 may be utilized to receive any suitable information with respect to any example provided herein. The data processing module 912 may include any suitable number of application programming interfaces with which the functionality of the test engine 900 may be invoked.

In some embodiments, the data processing module 912 may be configured to receive any suitable number and type of item assets (e.g., images, textual samples such as item descriptions, item feature sets, item titles, or the like). The data processing module 912 may be configured to store the item assets within item asset data store 904. The data processing module 912 may further be configured to receive user input provided via one or more user interfaces (e.g., user interfaces 300-700 of FIG. 3-7) managed by the test engine 900 (e.g., by the output module 920). The data processing module 912 may be configured to provide any suitable information received to any suitable combination of the remaining modules 902.

In some embodiments, the data processing module 912 may receive training data. In some embodiments, the training data may include any suitable data corresponding to user input (e.g., navigational selections, purchase history, shopping cart history, and the like) associated with user input received at a network page that presented a particular combination of one or more item assets (e.g., one or more item images, one or more titles, one or more item feature sets and/or attributes, one or more item descriptions, or the like). In some embodiments, an indication that the network page was visited and/or the item corresponding to the network page was added to a shopping cart and/or purchased/leased/procured by a user may serve as a training data example. Any suitable instance of training data examples may be received by the data processing module 912 and stored at training data store 906.

In some embodiments, the data processing module 912 may receive feedback data that may include additional metadata associated with an experiment. The data processing module may additionally be configured to receive feedback data that may include navigational data associated with one or more users (e.g., indicating webpages visited, hyperlinks selected, graphical element selection such as check box selections, edit box modifications, etc.), order data (e.g., indicating whether the item associated with a given item asset combination was purchased/leased/procured), and the like. The feedback data may correspond to any suitable user input provided via a network page that presents a combination of item assets. Feedback data may, in some embodiments, be obtained during a subsequent experiment In some embodiments, the model manager 914 may be configured to train any suitable number of models (e.g., feature model 110, feature model 114 of FIG. 1, feature model 202 of FIG. 2, etc.). By way of example, the model manager 914 may perform any of the operations discussed above in connection with FIG. 2 to train, update, and/or retrain a classification model and/or neural network to identify a feature vector (e.g., an image feature vector such as image feature vector(s) 112, a textual feature vector such as textual feature vector(s) 116, output 206, etc.) from input data.

In some embodiments, the model manager 914 (operating as part of a control plane of the test engine 900) may be configured to train a model to identify a positive impact score that quantifies a degree to which a particular combination of feature vectors (e.g., vectors corresponding to one or more images (e.g., including a feature image that is presented in a prominent position of a network page or which is the only item image presented), a title, a bulleted item feature set, an item description, or any suitable combination of the above). In some embodiments, the model manager 914 may utilize training data comprising a feature vector for each item asset presented via a single network page (e.g., an item detail page) and one or more instances of user input (e.g., navigational/hyperlink selections, purchase history, shopping cart history) related to one or more users to which a particular item asset combination was presented. This model (e.g., an asset combination scoring model) may be utilized to process an item asset vector combination provided as input and output a score quantifying a predicted positive impact of the particular combination of corresponding item assets. The training data may include the item asset combination (and/or corresponding item asset vectors) and an indication of a positive or negative impact. A positive impact may be considered to have occurred when user input is received indicating the user interacted with the network page, the item was added to a shopping cart, and/or the item was purchased, leased, or procured. A negative impact may be considered to have occurred when the item was not viewed, the user did not interact with the item's network page, the user did not add the item to the shopping cart, and/or the user did not purchase the item within a threshold period of time from when the combination was presented. In some embodiments, the training data may include any suitable metadata and/or features of any suitable number of item assets presented via a given network page. In some embodiments, the training data may be collected during one or more experiments and utilized to train the model to score the potential impacts of subsequent item asset combinations utilized in the one or more experiments. In some embodiments, an item asset combination may be selected as the "winner" or "optimal feature combination based at least in part on the score provided by the asset combination scoring model. For example, a highest scored combination may be selected as the winner or most-optimal asset combination. The data processing module 912 may invoke functionality of the model manager 914 at any suitable time. The asset combination scoring model, the feature models 110 and/or 114, and/or the feature model 202, or any suitable data related to these models may be stored in model data store 908.

The similarity assessment manager 916 may be configured to assess a degree of similarity between two item assets. In some embodiments, to assess a degree of similarity between two item assets, the similarity assessment manager 916 may be configured to identify similarity scores (e.g., quantifying a degree of similarity and/or dissimilarity between two item assets. In some embodiments, the similarity assessment manager 916 may be configured to provide one or more item assets in a given item asset set to a feature model trained by the model manager 914 (and potentially retrieved from model data store 908. In some embodiments, the feature model may provide output (e.g., output 206 of FIG. 2) indicating a feature set for the item asset. In some embodiments, the similarity manager may calculate a similarity score (e.g., a degree of similarity and/or dissimilarity between two item assets). In some embodiments, the similarity assessment manager 916 may be configured to convert an item asset to a vector (e.g., via a series of operations, via providing the item asset as input to the feature model 202, etc.). By way of example, the similarity assessment manager 916 may convert an image to a vector of pixel values. As another example, the similarity assessment manager 916 may be configured to convert a textual sample into a textual feature set (e.g., a vector generated via the TD-IDF techniques described above). In yet another example, the similarity assessment manager 916 may provide the item asset as input to the feature model 202 to obtain a feature set.

In some embodiments, the similarity assessment manager 916 may receive user input (e.g., via the data processing module 912) indicating user input that identifies an item. The similarity assessment manager 916 may retrieve one or more item assets of one or more item asset types from the item asset data store 904. The item assets for the identified item may be retrieved. For example, a set of images that depict the item, a set of potential item titles, one or more sets of item features, and the like may be obtained from the item asset data store 904 using an identifier for the item as a lookup value. For each type of item asset (e.g., image, title, feature set, description, etc.) the corresponding item assets may be converted to vectors (e.g., by converting the image to a vector of pixel values, using TD-IDF to generate a feature vector, using a model trained by model manager 914 such as a classification model, an example of which are feature models 110 and 114 of FIG. 1 and feature model 202 of FIG. 2, etc.). The similarity manager may select various pairs of assets (e.g., two image feature vectors corresponding to two images, two textual feature vectors corresponding to two textual samples, etc.) and assess the degree of similarity for the pair. In some embodiments, a similarity score may be calculated using a distance measurement such as a Euclidean distance, a structural similarity index, or the like. As another example, a cosine similarity may be calculated using two vectors. Any suitable distance measurement and/or comparison mechanism may be utilized. The similarity assessment manager 916 may be configured to generate an assessment of the degree of similarity (e.g., a similarity score) for every pair of item asset in a given set of item assets.

In some embodiments, the test manager 918 may be configured to utilize any suitable combination of item assets indicated by the user (e.g., via the user interfaces 300-700). By way of example, the user may identify one or more sets of item assets such as i) a set of images of an item, ii) a set of item titles for the item, iii) a set of item descriptions for the item, iv) a set of bulleted feature lists identifying one or more attributes/features of the item, or any suitable combination of the above. The test manager 918 may be configured to generate a network page that includes every unique combination/permutation of individual item assets from each set of item assets (e.g., every possible combination of one image (or a subset of images), one item title, one item description, and/or one item bulleted feature set). The test manager 918 (e.g., operating as part of a data plane of the test engine 900) may be configured to perform any suitable number of experiments with the generated network pages. For example, the test manager 918 may cause each combination to be provided in any suitable manner at an online retail website. The test manager 918 may utilize any suitable reinforcement learning techniques (e.g., a multi-armed bandit algorithm) to conduct the one or more experiments. By way of example, as users interact with the network pages (e.g., viewing the network page, adding the item to the user's shopping cart, purchasing the item, etc.), the test manager 918 may be configured to allocate more traffic to network pages for which more user interactions are observed. In some embodiments, each time a user interacts with the network page (or adds the items to a shopping cart, or purchases the item), the particular item asset combination displayed at the network page, along with an indication that that combination was effective may be added as a training data example and used to update and/or retrain a model (e.g., the asset combination scoring model). In some embodiments, user interactions (e.g., viewing, shopping cart additions, purchases, etc.) may be obtained by the test manager 918 and provided to the model manager 914. These user interactions may be utilized to update, train, or retrain any suitable model.

In some embodiments, the test manager 918 may be configured to assess an impact of providing a particular item asset combination. For example, the test manager 918 may perform an AB test in which a previously presented combination of item assets is provided to a first set of users, and a second set of users are provided the "winning" item asset combination as scored by the asset combination scoring model. The user interactions of each network page may be observed over a period of time and an impact score may be calculated based at least in part on the number of page views, the number of shopping cart additions, and/or the number of purchases/leases/procurements corresponding to each item associated with the respective network pages.

According to some embodiments, the output module 920 may be configured to provide one or more user interfaces such as user interfaces 300-700. Any of the user input provided via these interfaces may be received via the data processing module 912. In some embodiments, the output module 920 may be configured to highlight one or more portions of the user interface (e.g., area 616 of FIG. 6) based at least in part on the similarity assessment provided for a pair of item assets (e.g., by the similarity assessment manager 916). The output module 920 may be configured to provide, via one or more user interfaces, any suitable representation that indicates a degree of similarity between any suitable pair of item assets.

Figure 10:
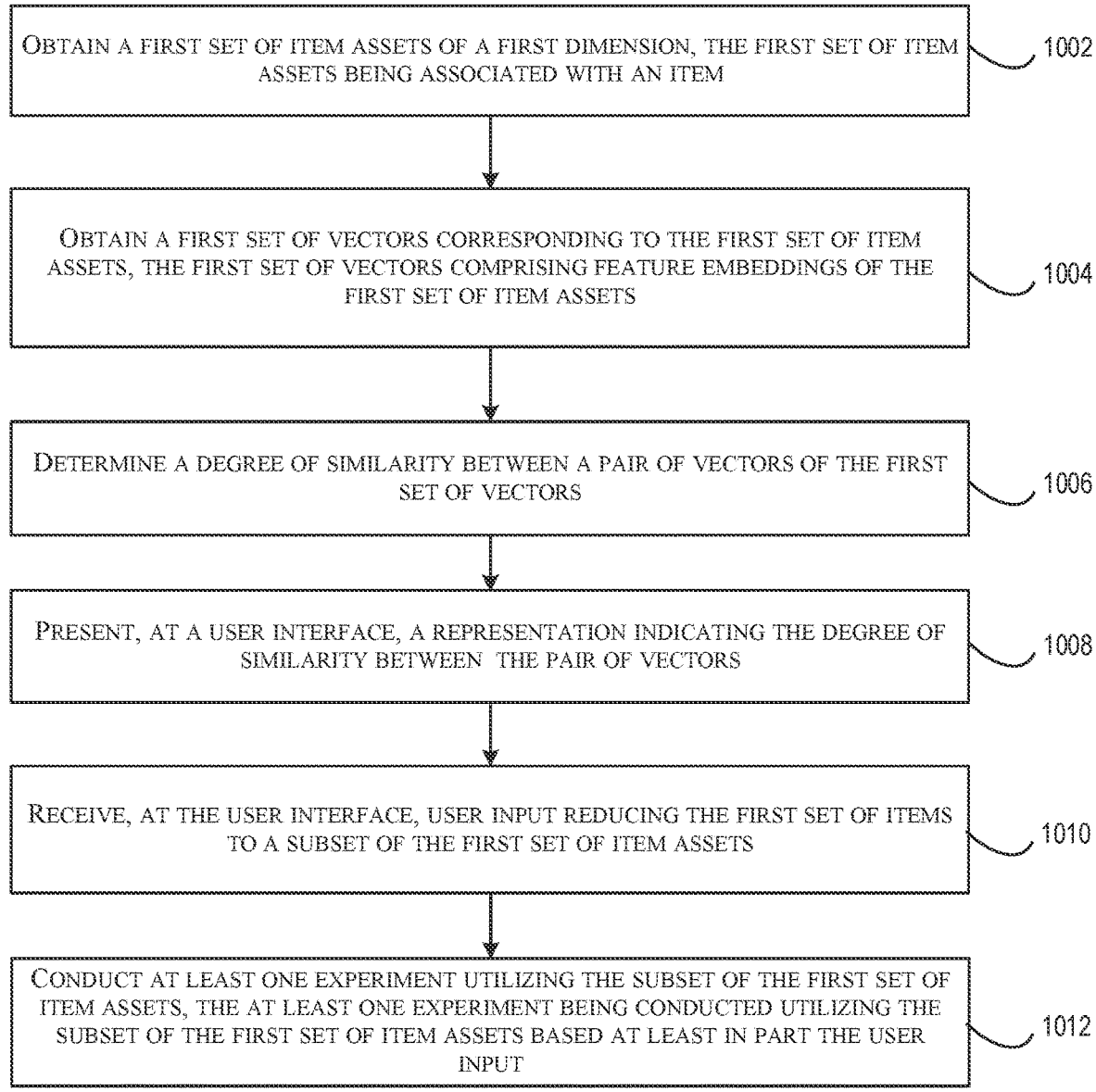
FIG. 10 is a flowchart illustrating an example method for providing a feature combination recommendation utilizing a design engine, in accordance with at least one embodiment.

FIG. 10 is a flowchart illustrating an example method for providing a feature combination recommendation utilizing a test engine 900 of FIG. 9, in accordance with at least one embodiment. A computer-readable medium may store computer-executable instructions that, when executed by at least one processor, cause at least one computer to perform instructions comprising the operations of the method 1000. It should be appreciated that the operations of the method 1000 may be performed in any suitable, not necessarily the order depicted in FIG. 10. Further, the method 1000 may include additional, or fewer operations than those depicted in FIG. 10. The operations of method 1000 may be performed by any suitable combination of the modules 902 of the test engine 900 of FIG. 9 which may operate in whole or in part on a user device (e.g., one or more of the user device(s) 804 of FIG. 8) and/or the service provider computer(s) 810 of FIG. 8.

The method 1000 may begin at 1002, a first set of item assets of a first dimension (e.g., images) may be obtained (e.g., by the similarity assessment manager 916 of FIG. 9). The first set of item assets may be associated with an item.

At 1004, a first set of vectors corresponding to the first set of item assets may be obtained. By way of example, the similarity assessment manager 916 may obtain an item asset vector for each item asset based at least in part on providing (directly, or via the model manager 914) the item asset to a model trained by the model manager 914 of FIG. 9 (e.g., feature models 110 and/or 114 of FIG. 1, feature model 202 of FIG. 2) and receiving an item vector as output (e.g., output generated by the model). In some embodiments, the first set of vectors comprises feature embeddings of the first set of item assets.

At 1006, a degree of similarity may be determined (e.g., by the similarity assessment manager 916) for a pair of vectors of the first set of vectors. By way of example, the similarity assessment manager 916 may calculate a structural similarity index (SSIM), a Euclidean distance, a cosine similarity, or a difference value quantifying a similarity/dissimilarity between two vectors.

At 1008, a representation indicating the degree of similarity between the pair of vectors may be presented (e.g., via the output module 920 of FIG. 9) at a user interface (e.g., the user interfaces 300-700 of FIGS. 3-7). For example, as depicted in FIGS. 3-7, a similarity score and the item assets may be displayed in a grid with a similarity score indicated for each pair. It should be appreciated that there are other ways a representation indicating the degree of similarity may be presented. For example, the item assets (e.g., images, textual samples, etc.) may be clustered/group and depicted within a threshold distance of one another to indicate a degree of similarity (e.g., a degree of similarity between the item assets that exceeds a predefined threshold). In some embodiments, pairs of item assets that have a degree of similarity at or above the threshold amount of similarity may be represented as a list at the user interface. It should be appreciated that the representation may include any suitable combination of identifiers of the item assets, the item assets themselves, a similarity score quantifying the similarity between a pair of item assets, or any suitable graphical user interface element to depict two image assets as having over a threshold amount of similarity.

At 1010, user input may be received (e.g., by the data processing module 912) at the user interface (e.g., via selections of the various options of FIGS. 3-6) reducing the first set of item assets to a subset of the first set of item assets. For example, FIGS. 3-6 provide one example of user input that may be received at the user interface, which can result in reducing the first set of item assets to a subset of the first set of items. In some embodiments, one item asset may be removed at a time from the first set of item assets. In other embodiments, the user may be provided the ability to multi-select any suitable number of items assets that may then be removed from the first set of item assets.

At 1012, at least one experiment may be conducted (e.g., by the test manager 918 of FIG. 9) utilizing the subset of the first set of item assets. In some embodiments, the at least one experiment may be conducted utilizing the subset of the first set of item assets based at least in part the user input provided at 1010.

Figure 11:
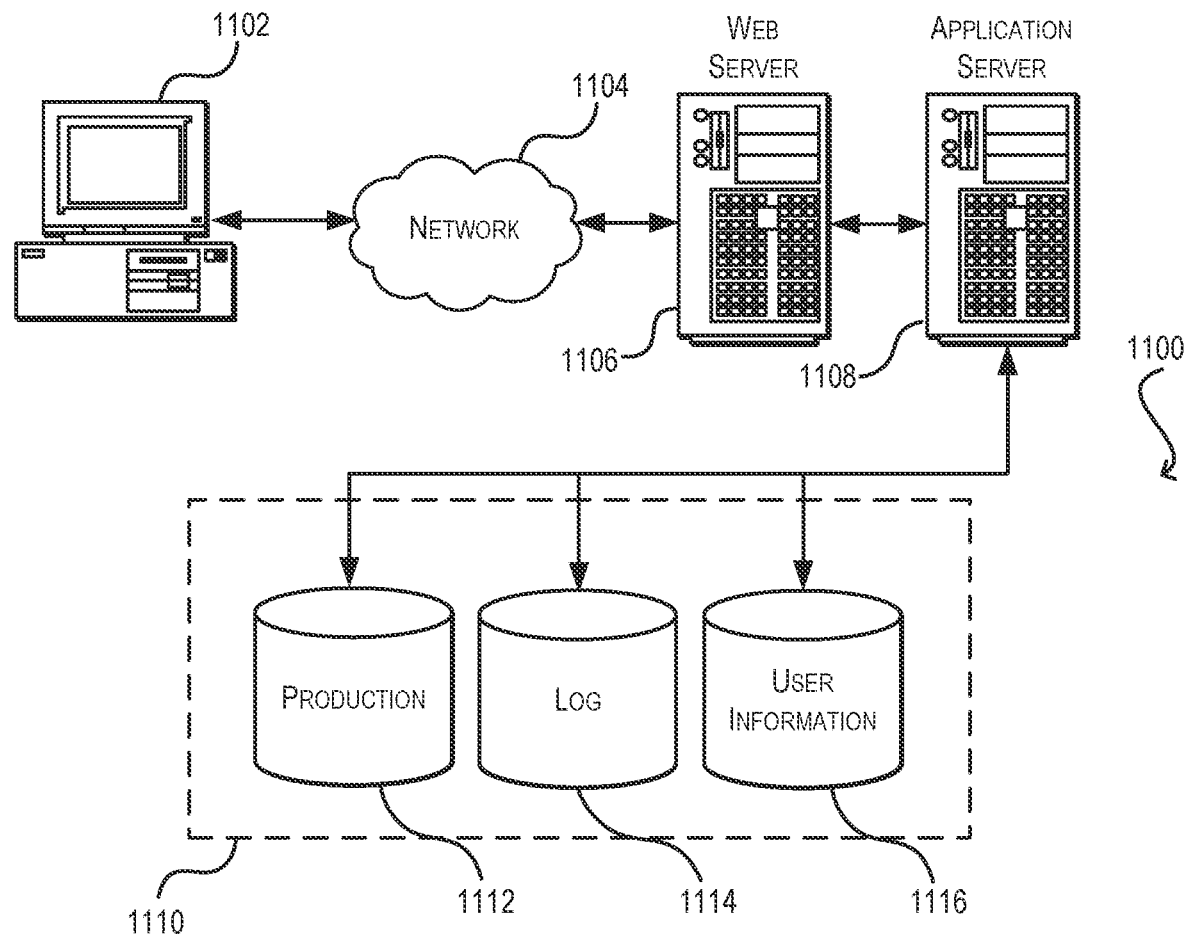
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes a user device 1102, which can include any appropriate device operable to send and receive requests, messages, or information over an appropriate network 1104 and convey information back to a user of the device. Examples of such client devices include personal computers, cell phones, hand-held messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computing device, a machine-learning model that has been previously trained to identify an image vector from an input image;
    obtaining, by the computing device, a set of image feature vectors based at least in part on providing individual images of a set of images to the machine-learning model as input, the set of images comprising varying images of an item;
    calculating, by the computing device, a similarity score for each pair of image feature vectors from the set of image feature vectors obtained from the machine-learning model;
    presenting, at a user interface, the similarity score for each pair of image feature vectors from the set of image feature vectors;
    receiving, via the user interface, user input indicating removal of a specific image from the set of images;
    in response to the user input, removing the image from the set of images;
    updating the user interface based at least in part on removing the image from the set of images; and
    conducting at least one user interface experiment utilizing the set of images as updated.

2. The computer-implemented method of claim 1, wherein presenting the similarity score comprises presenting a grid of similarity scores that comprises the similarity score.

3. The computer-implemented method of claim 2, further comprising highlighting one or more areas of the grid based at least in part on determining one or more corresponding similarity scores associated with the one or more areas exceeds a predefined threshold value.

4. The computer-implemented method of claim 1, further comprising:
    obtaining, by the computing device, an additional machine-learning model that has been previously trained to identify a textual feature vector from input text;
    obtaining, by the computing device, a set of textual feature vectors based at least in part on providing individual instances of text of a set of textual examples to the machine-learning model as input;
    calculating, by the computing device, an additional similarity score for each pair of instances of text from the set of textual feature vectors obtained from the machine-learning model;
    presenting, at the user interface, the similarity score for each pair of textual feature vectors from the set of textual feature vectors; and
    receiving additional user input indicating a subset of textual examples from the set of textual examples, wherein the at least one user interface experiment is conducted utilizing the subset of textual examples with the set of images as updated.

5. A computing device comprising:
    one or more processors; and
    one or more memories storing computer-executable instructions that, when executed with the one or more processors, cause the computing device to:
        obtain a first set of item assets of a first dimension, the first set of item assets being associated with an item;
        obtain a first set of vectors corresponding to the first set of item assets, the first set of vectors comprising feature embeddings of the first set of item assets;
        determine a degree of similarity between a pair of vectors of the first set of vectors;
        present, at a user interface a representation indicating the degree of similarity between the pair of vectors;
        receive, at the user interface, user input reducing the first set of item assets to a subset of the first set of item assets; and
        conduct at least one experiment utilizing the subset of the first set of item assets, the at least one experiment being conducted utilizing the subset of the first set of item assets based at least in part the user input.

6. The computing device of claim 5, wherein the computing device is further caused to:
    obtain a second set of item assets of a second dimension different from the first dimension, the second set of item assets being associated with the item;
    obtain a second set of vectors corresponding to the second set of item assets, the second set of vectors comprising respective feature embeddings of the second set of item assets;
    determine a second degree of similarity between a second pair of vectors of the second set of vectors;

present, at the user interface, a second representation indicating the second degree of similarity between the second pair of vectors at; and receive, at the user interface, second user input reducing the second set of item assets to a second subset of the second set of item assets, wherein the at least one experiment is conducted further utilizing the second subset of the second set of item assets.

7. The computing device of claim 6, wherein the first dimension is an image dimension and the second dimension is a textual dimension.

8. The computing device of claim 6, wherein the second set of item assets comprises at least one of: a plurality of item title variants, a plurality of item description variants, or a plurality of images of the item.

9. The computing device of claim 5, wherein the representation is a similarity score that is calculated based at least in part on calculating structural similarity index between the pair of vectors.

10. The computing device of claim 9, wherein the similarity score is presented as one of a plurality of similarity scores, the plurality of similarity scores corresponding to varying pairs of the first set of item assets.

11. The computing device of claim 5, wherein the computing device is further caused to present the representation of the degree of similarity differently with respect to other representations of similarity corresponding to other pairs of item assets, wherein the representation is presented differently based at least in part on determining that the degree of similarity between the pair of vectors of the first set of vectors meets a threshold condition.

12. The computing device of claim 5, wherein the user input received at the user interface comprises one or more selections indicating a removal of a corresponding item asset from the first set of item assets.

13. The computing device of claim 12, wherein the at least one experiment is performed utilizing a multi-armed bandit algorithm.

14. A non-transitory computer readable storage medium comprising computer-executable instructions that, when executed with one or more processors of a computing device, cause the computing device to perform operations comprising:

obtaining a first set of vectors corresponding to a first set of item assets of a first dimension corresponding to an item, the first set of vectors comprising feature embeddings corresponding to the first set of item assets;

obtaining a second set of vectors corresponding to a second set of item assets of a second dimension corresponding to the item, the second dimension being different from the first dimension, the second set of vectors comprising additional feature embeddings corresponding to the second set of item assets;

presenting, via a first user interface element, a first representation indicating a first degree of similarity between a first pair of vectors of the first set of vectors;

presenting, via a second user interface element, a second representation indicating a second degree of similarity between a second pair of vectors of the second set of vectors;

receiving user input at the first user interface element and the second user interface element, the user input indicating a reduction in the first set of item assets or the second set of item assets; and conducting at least one experiment utilizing a first subset of item assets from the first set of item assets and a second subset of item assets from the second set of item assets, the first subset of item assets and the second subset of item assets being identified based at least in part on the user input.

15. The non-transitory computer readable storage medium of claim 14, wherein conducting the at least one experiment comprises:

presenting the first subset of item assets to varying sets of users at a webpage;

monitoring for subsequent user input received at the webpage; and selecting, from the first subset of item assets, a particular item asset based at least in part on monitoring the subsequent user input.

16. The non-transitory computer readable storage medium of claim 15, wherein conducting the at least one experiment comprises:

presenting the second subset of item assets at the webpage to various users;

monitoring for additional user input received at the webpage and corresponding to the second subset of item assets; and selecting, from the second subset of item assets, a specific item asset based at least in part on monitoring the additional user input.

17. The non-transitory computer readable storage medium of claim 16, wherein the computing device performs further operations comprising, indicating at a subsequent user interface, the particular item asset of the first set of item assets and the specific item asset from the second set of item assets.

18. The non-transitory computer readable storage medium of claim 14, wherein the first set of item assets comprises a set of images and wherein the second set of item assets comprise a set of textual segments.

19. The non-transitory computer readable storage medium of claim 14, wherein the first representation is a first similarity score that is calculated based at least in part on calculating a Euclidean distance between the first pair of vectors, and wherein the second representation is a second similarity score that is calculated based at least in part on calculating an additional Euclidean distance between the second pair of vectors.

20. The non-transitory computer readable storage medium of claim 14, wherein conducting the at least one experiment utilizing the first subset of item assets from the first set of item assets causes a single item asset of the first subset of item assets to be selected from the first subset of item assets and presented to a user.

* * * * *